Nov. 10, 1953  P. P. SCHEURER  2,658,503
AIR HEATING FURNACE FOR ABOVE AND BELOW FLOOR MOUNTING
Filed Sept. 21, 1949  3 Sheets-Sheet 3
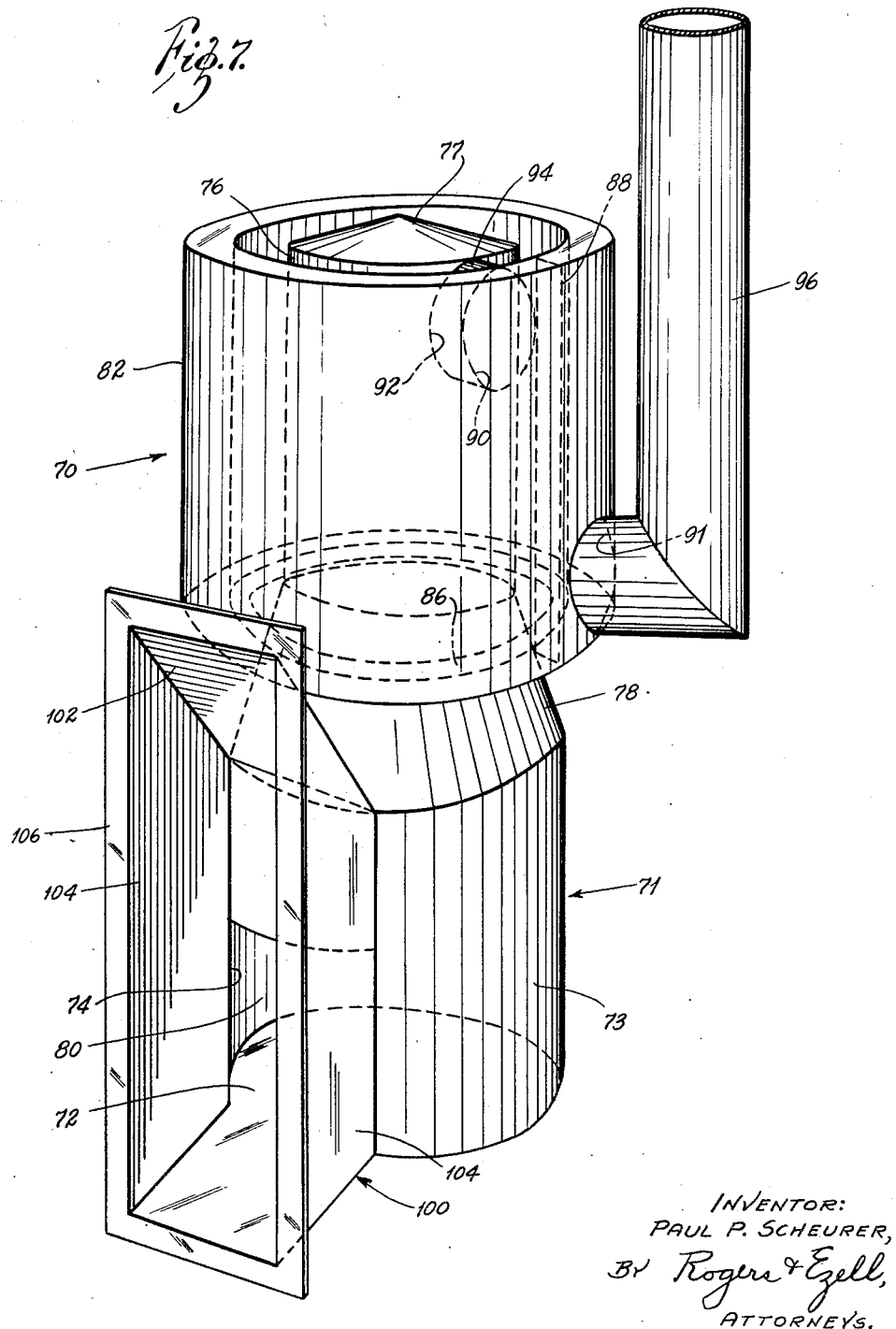
INVENTOR:
PAUL P. SCHEURER,
BY Rogers & Ezell,
ATTORNEYS.

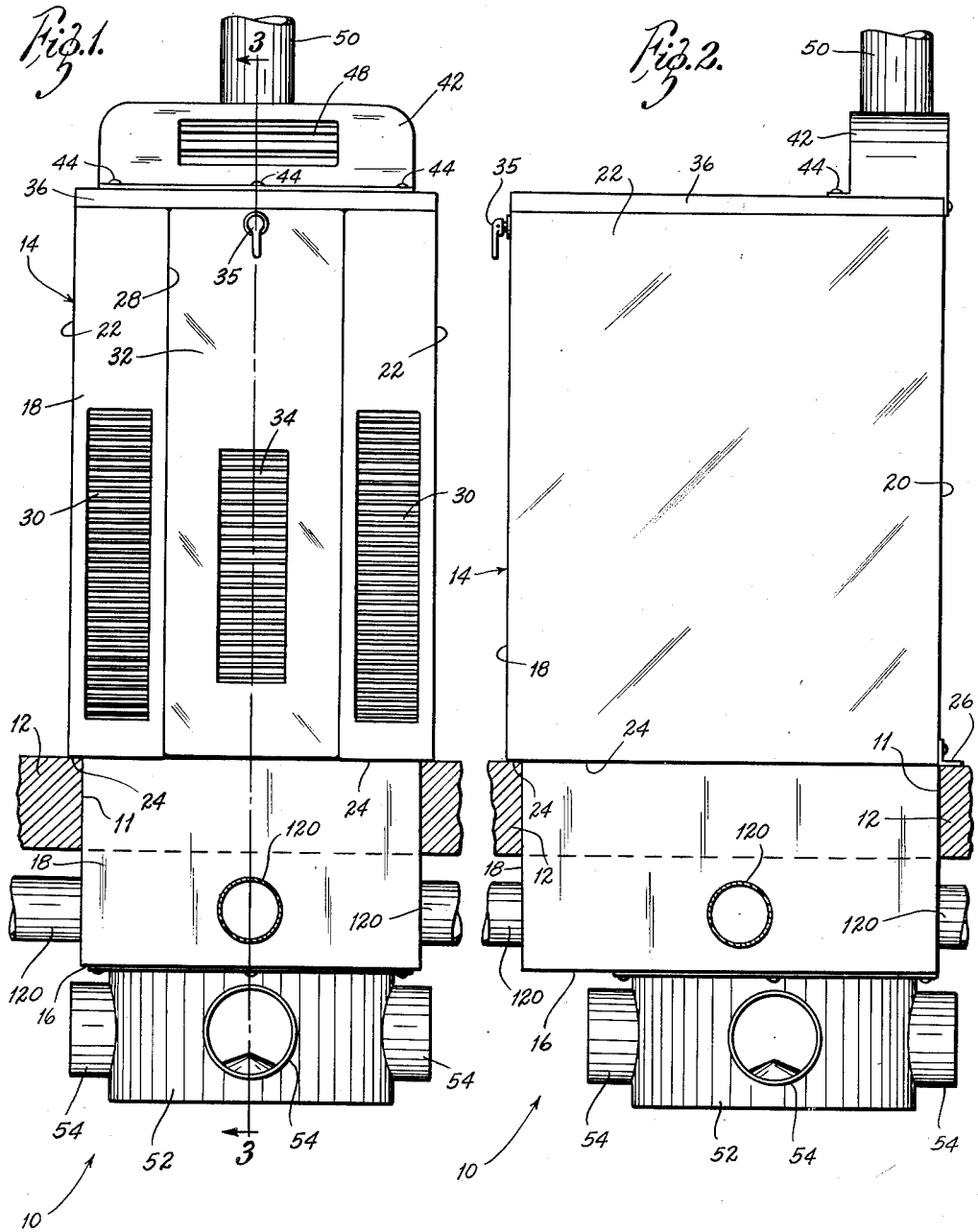

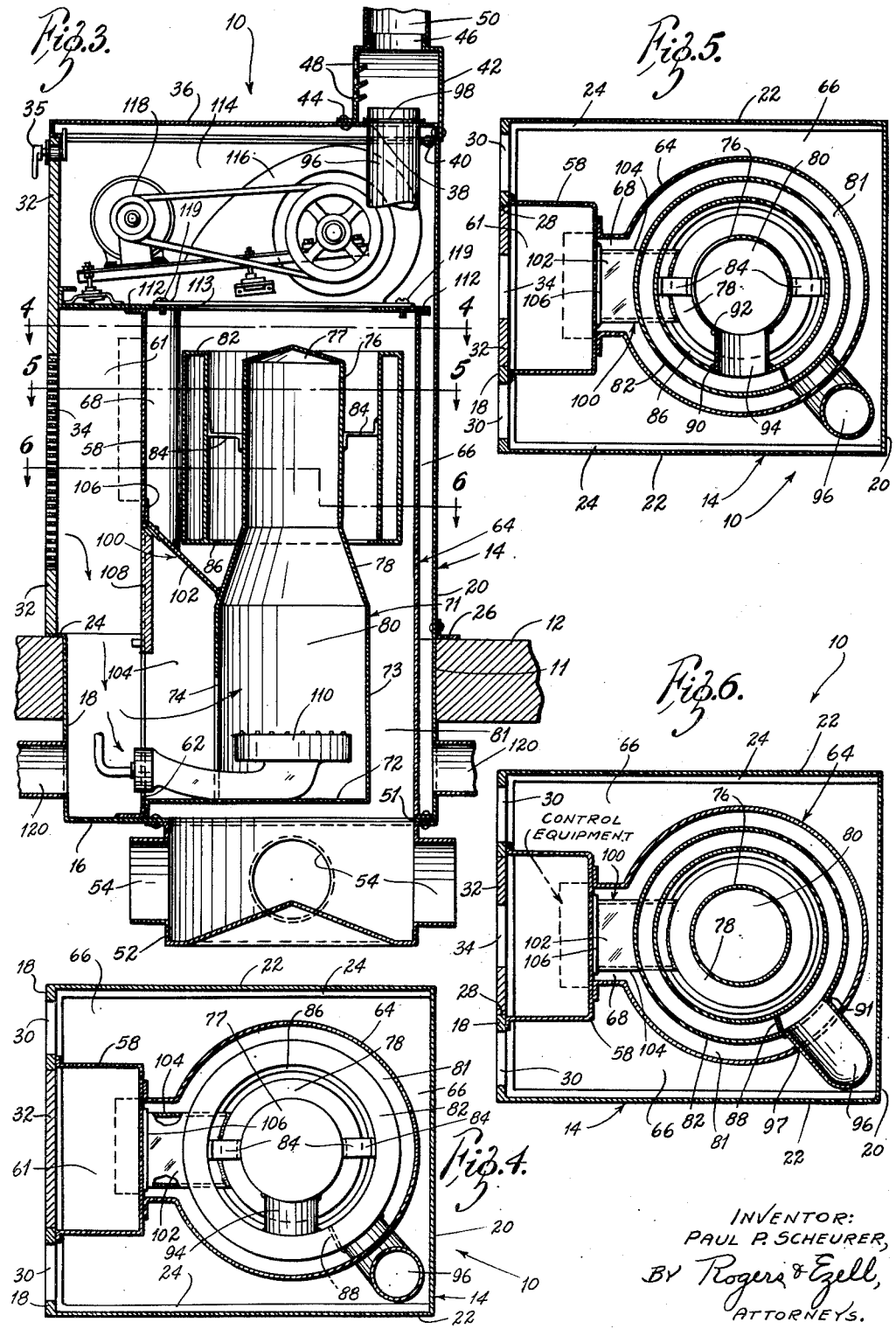

Patented Nov. 10, 1953

2,658,503

UNITED STATES PATENT OFFICE 2,658,503

AIR HEATING FURNACE FOR ABOVE AND BELOW FLOOR MOUNTING

Paul P. Scheurer, Wichita Falls, Tex.

Application September 21, 1949, Serial No. 116,892

10 Claims. (Cl. 126—110)

1

The present invention relates generally to the furnace art, and more particularly to a novel gas-fired furnace which extends partially above and partially below the floor level.

In its preferred form, the furnace includes a housing which is adapted to be supported so as to extend partially above and partially below the floor level. A heating chamber is disposed within the housing and spaced from the walls thereof so as to provide a preheating chamber between it and the walls of the housing. A combustion chamber containing a gas burner adjacent the bottom thereof is disposed within the heating chamber, the burner being below the floor level. An outlet duct header is disposed below the heating chamber and means are provided for admitting cold air into the preheating chamber either above or below the floor level. A blower assembly is disposed in the upper portion of the housing and is adapted to move the air from the preheating chamber down through the heating chamber and into the outlet duct header. A removable door is provided in the housing above the floor level so that the floor assembly is easily accessible and the gas burner can be removed for inspection and repair.

In most of the southern states, the homes do not have basements. Consequently, where a central heating unit is used, the usual practice is to dig a pit under the house to accommodate the heating unit which is almost universally completely disposed below the floor level. This has many disadvantages, among which are that the unit is practically inaccessible for inspection and repair and water often accumulates under the house and extinguishes the fire.

It is an object of the present invention, therefore, to provide a novel furnace which extends partially above and partially below the floor level. Especially is it an object to provide a furnace that extends below the floor level only a short distance, in such wise that the duct and fuel lines may be made below the floor, but with the remaining parts above the floor, and with all parts requiring servicing accessible from the floor level.

Another object is to provide a hot air furnace in which the burner and hot air outlets are below the floor level and the blower and cold air inlets are above the floor level.

Another object is to provide a gas-fired furnace which contains an opening above the floor level which is normally closed by a removable door, the opening providing means whereby the control equipment and the blower assembly can be inspected and repaired, and through which

2 the burner can be easily removed for inspection and repair.

Another object is to provide a hot air furnace in which the air being heated is passed through a preheating chamber and a heating chamber.

Other objects are to provide a furnace which is efficient, relatively inexpensive to manufacture, and which is compact in construction whereby it can be installed under a sink, in a closet, etc.

Further objects and advantages of the present invention will be apparent from the following description, reference being had to the accompanying drawings wherein a preferred embodiment of the present invention is shown, in which:

Fig. 1 is a front elevational view of a furnace constructed in accordance with the teachings of the present invention;

Fig. 2 is a side elevational view of the furnace;

Fig. 3 is a vertical transverse sectional view taken on approximately the line 3—3 in Fig. 1;

Figs. 4, 5 and 6 are horizontal transverse sectional views taken on the lines 4—4, 5—5, and 6—6 in Fig. 3; and Fig. 7 is a perspective view of the combustion casing.

Referring to the drawings more particularly by reference numerals, 10 indicates generally a furnace embodying the teachings of the present invention, which is shown disposed in an opening 11 formed in a floor 12.

The furnace 10 includes an outer, and conveniently rectangularly shaped housing 14 having a bottom wall 16, a front wall 18, a back wall 20, and side walls 22.

The housing 14 is provided with means whereby it may be inserted partially through the floor opening 11 and supported in such position by the floor 12. As shown, the front wall 18 and the side walls 22 contain a step-like shoulder portion 24 (Figs. 1, 2 and 3) which rests on the upper surface of the floor 12, and the back wall 20 may have an angle iron 26 fastened thereto in the same relative position. Manifestly, the latter is not necessary, but is merely desirable.

An elongated, vertical, rectangular shaped service opening 28 (Fig. 1) is contained medially in the part of the front wall 18 above the shoulder 24, and, similarly, cold air vents 30 are formed on each side thereof. The medial service opening 28 is closed by a removable door 32. The door has a series of vents 34 in the center and a locking assembly 35 at its upper end.

A cover member 36 (Fig. 3) containing a circular opening 38 in one corner thereof is fastened to the upper end of the housing 14 by rivets 40. A flue connecting and down-draft eliminating casing 42 that extends across the back of the furnace (Fig. 3) is fastened by rivets 44 to the cover 36 adjacent its rear edge. The top of the casing 42 contains a flanged circular flue opening 46 in the middle of its upper wall, which receives the end of a chimney pipe 50. A series of louver-like openings 48 in the front wall of the flue casing 42 provide down-draft elimination, as will appear.

The bottom wall 16 (Fig. 3) of the housing 14 contains an opening 51. A duct header or plenum chamber member 52, which contains flange surrounded openings 54 in the side walls thereof, is riveted or otherwise secured to the bottom wall 16, the open upper end of the header 52 being in alignment with the opening 51.

A control chamber is formed back of the medial opening 28 in the front wall 18 of the main casing 14 to be closed by the lower part of the removable panel 32. To provide this chamber, there is a control chamber wall member 58 (Figs. 4 to 6) of U-shaped vertical cross section extending from the bottom wall 16 of the casing 14 upwardly approximately three-quarters of the height of the casing 14. The flanged, open edges of the U-shaped member 58 are fastened to the front wall 18, and the flanged bottom edge of the member 58 is secured to the bottom wall 16 by welding. As will appear, the top of this U-shaped member 58 is closed so as to provide a control chamber 61. The lower part of the back wall of the U-shaped member 58 has an opening 62 therethrough.

The control chamber 61, as will appear, also acts as a part of a combustion-air inlet.

A cylindrical casing 64 (Figs. 3-6) is disposed within the housing 14 so as to form a preheating chamber 66 between it and the walls of the housing 14. The casing 64 is open at the front and the vertical edges of the wall at the opening are bent back and flanged, the flanged portion being welded to the back of the transverse wall of the control casing member 58. The front opening thus described provides a mouth or passageway 68, the lower portion of which is in alignment with the opening 62 in the control chamber casing 58.

A combustion casing 70 (Fig. 7) is disposed within the casing 64. It includes a cylindrical shaped lower portion 71 having a bottom wall 72 and a side wall 73 which contains a rectangular shaped opening 74 therein. It also includes a cylindrically shaped upper portion 76 of reduced diameter having a cap 77 on the upper end thereof. The two portions 71 and 76 are joined together by a frusto-conical shaped intermediate portion 78, the three portions forming a combustion chamber 80. A cylindrical opening 82 (Fig. 5) is contained in the wall of the upper portion 76 adjacent the upper end thereof.

The chamber inside the preheating casing 64 and outside the combustion casing 70 comprises a primary heat exchange chamber 81.

A hollow annulus 82 is disposed about the upper portion 76 of the combustion casing 70 and spaced therefrom, and is maintained in position by brackets 84 which are welded to its inner wall and the wall of the upper portion 76. An inwardly extending ring-like flange 86 is disposed adjacent the bottom of the annulus 82 for a purpose to appear.

A vertically extending elongated baffle plate 88 (Fig. 7) is disposed within the annulus 82. Openings 90 and 91 (Figs. 5, 6 and 7) are contained in the inner and outer walls of the annulus 82, respectively, on opposite sides of the plate 88, the opening 90 being adjacent the upper end of the annulus 82 and the opening 91 being adjacent the lower end thereof. A short pipe 94 connects the openings 90 and 92 to provide a flue passage between the combustion casing 70 and the annulus 82.

An L-shaped flue pipe 96 (Figs. 4-7) connects to the opening 91 at the bottom of the annulus 82. It extends outwardly through a suitable opening 97 in the preheating casing 64, and thence upwardly in one corner of the casing 14, through the opening 38 in the top cover member 36 to discharge into the end of the down-draft eliminator casing 42. The upper end of the pipe 96 is maintained in position by a ring 98.

An air inlet passage member 100 of funnel shape (Fig. 7) leads into the lower section 71 of the combustion casing 70. It has a sloping top wall 102, straight side walls 104, and a straight bottom wall formed as an extension of the bottom wall 72 of the combustion casing 70. The passage member 100 extends to the lower portion of the control chamber member 58, so that the larger end thereof is in alignment with the opening 62 in the member 58. The smaller end of the passage member 100 encompasses the opening 74. The larger end of the member 100, which is surrounded by a flange-like portion 106, is fastened to the member 58 by welding, and the smaller end is welded to the lower portion 71 of the combustion casing 70.

A door 108 (Fig. 3) approximately one-half the length of the larger opening in the member 100 is hinged to the outer edge of the sloping top wall 102.

A gas burner 110 (Fig. 3) of conventional design is positioned on the bottom wall 72 within the lower portion 71 of the combustion casing 70, the stem-like portion of the burner protruding through the openings 74 and 62.

A plate 112 (Fig. 3) of approximately the same shape as the upper end of the casing 64 and the area defined by the control chamber member 58 (Figs. 4-6) is fastened to the upper end of the casing 64. As already mentioned, it constitutes a top wall for the control chamber 61, and it also provides a blower chamber 114 in the upper portion of the housing 14. The plate 112 contains an opening 113 which is in alignment with the combustion casing 70. As shown in Fig. 3, the plate 112 is spaced from the walls of the housing 14 so as to provide a passageway between the preheating chamber 66 and the blower chamber 114.

A blower 116 (Fig. 3) and driving means 118 of conventional construction are mounted on the plate 112, the blower inlets opening into the blower chamber, and the outlet being fastened over the opening 113 in the plate 112 by screws 119.

Control equipment (not shown) is mounted on the transverse portion of the member 58 within the control chamber 61.

If desirable, cold air return ducts 120 (Figs. 1 and 2) which lead from the individual rooms can be connected to the lower portion of the main housing 14.

*Operation*

The primary and secondary air necessary to support combustion of the gas enters the furnace 10 through the vent 34 contained in the door 32. The air then flows downwardly through the control chamber 61 (Fig. 3) to the area below the door 108. The primary air enters the mixing chamber of the burner 110 and the secondary air passes through the opening 60 below the door 108, and thence via the inlet passage portion 100 into the combustion chamber 80.

When the burner 110 is in operation, the hot products of combustion flow upwardly in the lower portion 71, the intermediate portion 78, and thence into the upper portion 76, the hot gas transferring a portion of its heat to the walls of said portions as it passes through them.

The hot gas then flows from the upper portion 76 through the pipe 94 (Fig. 7) and into the hollow annulus 82 adjacent one side of the baffle plate 88. The gas then flows around the annulus 82 to the other side of the plate 88, and then out through the opening 92 and up through the pipe 96, the casing 42 and the pipe 50.

Thus, in passing through the chambers and pipes as described above, the hot gas transfers a large percentage of its heat to the surfaces of the combustion casing 70, the annulus 82, and the pipes 94 and 96.

The heat from the combustion casing 70 raises the temperature of the primary heat exchange chamber 81 within the casing 64, and some of the heat also passes through the vertical wall of the casing 64 and into the preheating chamber 66. In addition, the temperature in the preheating chamber 66 is further increased by the heat from the pipe 96 which passes upwardly therethrough adjacent one corner of the housing 14.

When the blower 116 is in operation, air is drawn through the vents 39 contained in the front wall 18 (and the return ducts 120 if they are used), and into the preheating chamber 66 (Figs. 5-6). It is then drawn upwardly to the blower chamber 114 and into the inlets of the blower 116. The air is discharged from the outlet of the blower 116 into the primary heat exchange chamber 81, being forced downwardly over the hollow annulus 82 and the upper portion 76 of the combustion casing 70.

The air passing downwardly between the upper portion 76 and the hollow annulus 82 is deflected inwardly by the flange 86 so that it sweeps across the wall of the intermediate portion 78. It thereby derives greater heat from this very hot portion of the combustion casing, and tends to prevent the portion 78 from becoming excessively hot.

The air then passes around the lower portion 71 into the duct header 52 and thence to the various rooms through ducts (not shown).

If the house being heated contains a large number of rooms, it is advantageous to use the return ducts 120 to bring the cold air from the individual rooms and introduce it into the lower portion of the preheating chamber 66, rather than to rely upon the return of air through the rooms themselves. In some installations, this obtains improved temperature control of the rooms, and improves the heat transfer through the furnace as it requires the incoming air to circulate the full length of the preheating chamber 66.

The door 32 can be easily and quickly removed by actuating the locking assembly 35 and lifting the door out bodily, thereby providing easy access to the blower chamber 114 and the control chamber 61 for either inspection or repair.

To remove the burner 110, it is only necessary to swing the door 108 upwardly to a vertical position and then slide the burner out through the openings 74 and 62.

Thus, it is apparent that all major parts are easily and quickly accessible for inspection and repair.

Also, because the burner 110 is close to floor level, there is less chance of water collecting around it and extinguishing the flame.

Furthermore, the fact that the outlet header 52 and the lower portion of the casing 14 are directly below the floor level permits the hot air ducts and the return ducts to be placed immediately below the floor level without using vertical duct work.

Thus, it is apparent that there has been provided a novel gas furnace which fulfills all of the objects and advantages sought therefor.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

1. A furnace for installation in an opening in a floor or the like; comprising a furnace housing having therein a hollow body defining a combustion chamber, a casing spaced intermediate said housing and said hollow body and defining on the inside a heating chamber, a heat source in the bottom portion of the combustion chamber; means for supporting the furnace in the opening, the means being on the housing intermediate the bottom and top of the combustion and heating chambers so that a portion of the combustion chamber and a portion of the heating chamber extend below the supporting means, and hence may extend below the floor level, and a portion of said chambers may extend above the floor level, and walls defining an outlet chamber in open communication with said heating chamber below said heating and combustion chambers.

2. In a furnace of the type described, a lower cylindrical casing; an upper cylindrical casing of reduced diameter disposed above the lower casing; an intermediate frusto-conical shaped casing with the larger end at the bottom connecting the upper and lower casings; a hollow annulus disposed about and in communication with the upper casing and spaced therefrom, said hollow annulus having an outlet; an inwardly extending flange-like member mounted on the lower end of the annulus for directing air passing downwardly between the annulus and the upper casing inwardly toward the surface of the intermediate casing.

3. A furnace of the type described, comprising a housing, means including a floor engaging member associated with the housing intermediate its top and bottom for supporting the furnace in an opening contained in a floor or the like intermediate the top and bottom of said housing so that a portion of the housing extends above the floor level and a portion extends below the floor level; one side of the housing having an opening above the floor engaging member; a door removably secured in said opening; a combustion chamber containing a heat source in the lower portion thereof disposed in the housing; the heat source being below the floor engaging member; said combustion chamber having an opening adjacent the bottom thereof for removal of the heat source for inspection and repair; the combustion chamber being spaced from the housing wall containing the opening a sufficient distance to permit the heat source to be moved upwardly between the combustion chamber and the bottom portion of the housing and out through the opening in the housing.

4. A furnace of the type described, comprising a housing, means including a floor engaging member associated with the housing intermediate its top and bottom for supporting the furnace in an opening contained in a floor or the like intermediate the top and bottom of said housing so that a portion of the housing extends above the floor level and a portion extends below the floor level; one side of the housing having an opening above the floor engaging member; a door removably secured in said opening; a combustion chamber containing a gas burner in the lower portion thereof disposed in the housing, the burner being below the floor engaging member; said combustion chamber having an opening adjacent the bottom thereof for removal of the burner for inspection and repair; the combustion chamber being spaced from the housing wall containing the opening a sufficient distance to permit the burner to be withdrawn upwardly between the combustion chamber and the bottom portion of the housing and out through the opening in the housing.

5. A furnace of the type described, comprising a housing, means including a floor engaging member associated with the housing intermediate its top and bottom for supporting the furnace in an opening contained in a floor or the like intermediate the top and bottom of said housing so that a portion of the housing extends above the floor level and a portion extends below the floor level; one side of the housing having an opening extending substantially the height of the portion above the floor engaging member; a door removably secured in said opening; a blower assembly mounted in the upper portion of the housing having an inlet in communication with air inlets in said housing and having an outlet in communication with the exterior of a hollow body for heating of air, said assembly being exposed for inspection and repair when the housing door is removed; said hollow body defining a combustion chamber containing a gas burner in the lower portion thereof disposed in the housing, the burner being below the floor engaging member; said combustion chamber having an opening adjacent the bottom thereof for removal of the burner for inspection and repair; the combustion chamber being spaced from the housing wall containing the opening a sufficient distance to permit the burner to be withdrawn upwardly between the combustion chamber and the bottom portion of the housing and out through the opening in the housing above the floor engaging member.

6. A furnace of the type described, comprising a housing, means including a floor engaging member associated with the housing intermediate its top and bottom for supporting the furnace in an opening contained in a floor or the like intermediate the top and bottom of said housing so that a portion of the housing extends above the floor level and a portion extends below the floor level; an outlet duct header disposed below the housing; said housing having openings communicating with the interior of said furnace below the floor engaging member for receiving cold air return ducts for recycling of air to said furnace.

7. A furnace of the type described, comprising a housing, means including a floor engaging member associated with the housing intermediate its top and bottom for supporting the furnace in an opening contained in a floor or the like intermediate the top and bottom of said housing so that a portion of the housing extends above the floor level and a portion extends below the floor level; a casing disposed within the housing so as to provide a preheating chamber between the walls of the housing and the casing; a hollow body defining a combustion chamber disposed within the casing so as to provide a heating chamber between the walls of the casing and the combustion chamber; an outlet duct header disposed below and in open communication with the heating chamber; said housing having openings below the floor engaging member for receiving return ducts; said casing having an opening between the preheating chamber and the heating chamber adjacent the upper ends thereof; and means for moving air from the preheating chamber down through the heating chamber and into the outlet duct header.

8. A furnace comprising a housing, a hollow body defining a combustion chamber within said housing, a cylindrical casing spaced between said housing and said hollow body and defining a heating chamber between it and said hollow body and defining a preheating chamber between it and said housing, said housing having air openings for the admission of air to said preheating chamber, said cylindrical casing having an opening for the passage of air from the preheating chamber to the heating chamber, walls defining an outlet duct header beneath said heating chamber and in open communication therewith; and means including a floor engaging member associated with the housing intermediate its top and bottom and openings in said housing below said floor engaging member for receiving cold air return ducts.

9. A furnace comprising a housing, a hollow body defining a combustion chamber within said housing, a cylindrical casing spaced between said housing and said hollow body and defining a heating chamber between it and said hollow body and defining a preheating chamber between it and said housing, said housing having air openings for the admission of air to said preheating chamber, said cylindrical casing having an opening for the passage of air from the preheating chamber to the heating chamber, walls defining an outlet duct header beneath said heating chamber and in open communication therewith; means including a floor engaging member associated with the housing intermediate its top and bottom and openings in said housing below said floor engaging member for receiving cold air return ducts; and a hollow annular member disposed intermediate said casing and said hollow body containing a vertically extending partition therein and an inwardly extending flange-like member mounted on the lower end of said annular member; a conduit connecting the upper portion of said combustion chamber with the upper portion of said annular member on one side of the partition; and an outlet for said member on the other side of the partition.

10. A furnace comprising a housing, a hollow body defining a combustion chamber within said housing, a cylindrical casing spaced between said housing and said hollow body and defining a heating chamber between it and said hollow body and defining a preheating chamber between it and said housing, said housing having air openings for the admission of air to said preheating chamber, said cylindrical casing having an opening for the passage of air from the preheating chamber to the heating chamber, walls defining an outlet duct header beneath said heating chamber and in open communication therewith; means including a floor engaging member associated with the housing intermediate its top and bottom and openings in said housing below said floor engaging member for receiving cold air return ducts; and a plate associated with said housing defining a blower chamber above the heating chamber and having a first opening for connecting the preheating chamber with said blower chamber and a second opening in the lining connecting the blower chamber with the heating chamber.

PAUL P. SCHEURER.

References Cited in the file of this patent

UNITED STATES PATENTS

| Number | Name | Date |
|---|---|---|
| 259,806 | Brown | June 20, 1882 |
| 289,967 | Boynton | Dec. 11, 1883 |
| 505,510 | Dickinson | Sept. 26, 1893 |
| 1,074,194 | Pascoe | Sept. 30, 1913 |
| 1,089,728 | Smith | Mar. 10, 1914 |
| 1,169,448 | Williams | Jan. 25, 1916 |
| 1,175,069 | Mackey | Mar. 14, 1916 |
| 1,490,135 | Skinner | Apr. 15, 1924 |
| 1,589,865 | Seltzer | June 22, 1926 |
| 1,660,690 | Terry | Feb. 28, 1928 |
| 2,020,862 | Watson | Nov. 12, 1935 |
| 2,285,108 | Bryant | June 2, 1942 |
| 2,318,393 | Honerkamp | May 4, 1943 |